July 9, 1935.  F. C. CRAWFORD  2,007,793
TUBULAR FRONT AXLE AND METHOD OF MAKING SAME
Filed Dec. 19, 1925   3 Sheets-Sheet 1
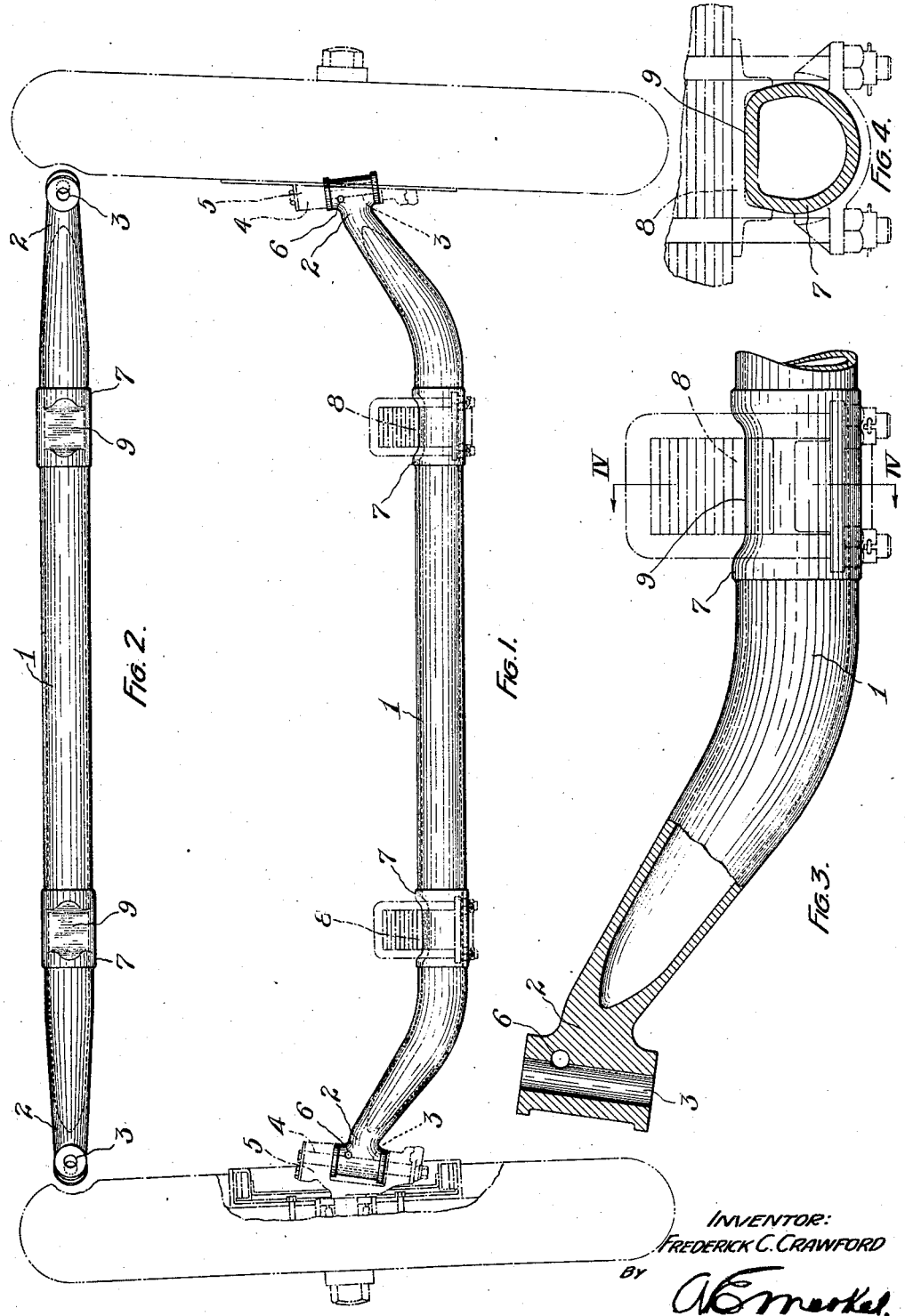
INVENTOR:
FREDERICK C. CRAWFORD
BY
ATTORNEY.

July 9, 1935.    F. C. CRAWFORD    2,007,793
TUBULAR FRONT AXLE AND METHOD OF MAKING SAME
Filed Dec. 19, 1925    3 Sheets-Sheet 2
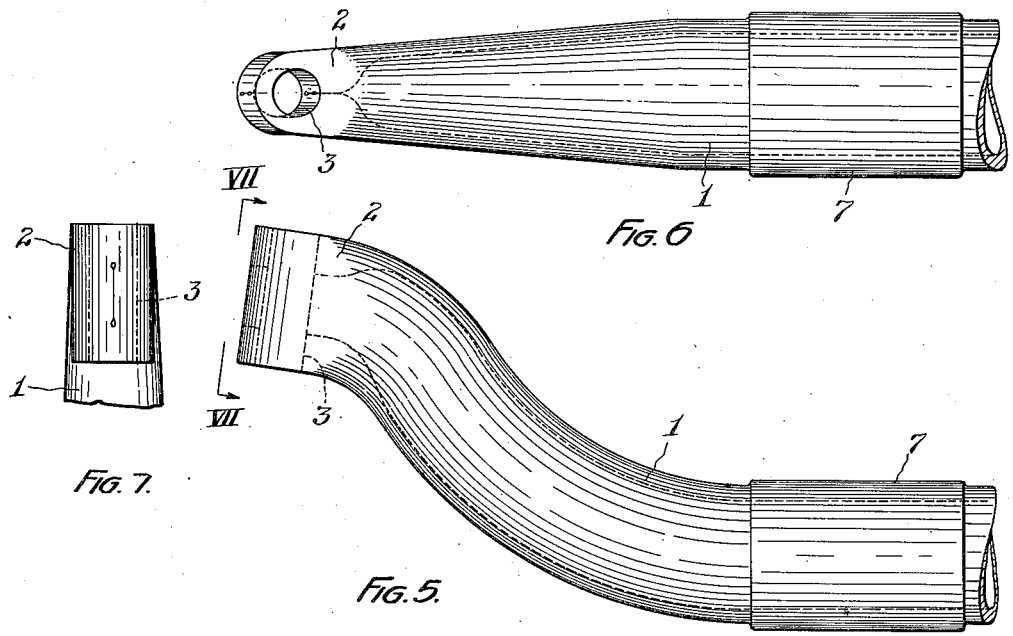
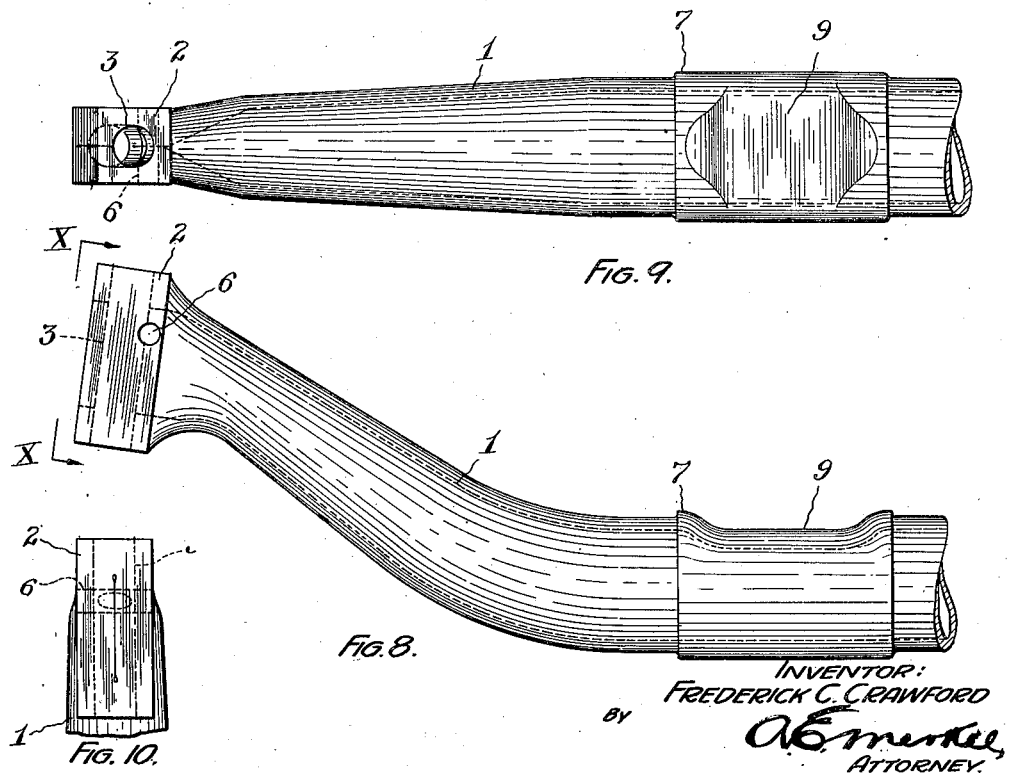
INVENTOR:
FREDERICK C. CRAWFORD
BY
ATTORNEY.

July 9, 1935. F. C. CRAWFORD 2,007,793
TUBULAR FRONT AXLE AND METHOD OF MAKING SAME
Filed Dec. 19, 1925  3 Sheets-Sheet 3

INVENTOR:
FREDERICK C. CRAWFORD
BY
ATTORNEY.

Patented July 9, 1935

2,007,793

UNITED STATES PATENT OFFICE 2,007,793

TUBULAR FRONT AXLE AND METHOD OF MAKING SAME

Frederick C. Crawford, Detroit, Mich., assignor to Thompson Products Inc., Cleveland, Ohio, a corporation of Ohio Application December 19, 1925, Serial No. 76,453

9 Claims. (Cl. 29—153)

The invention relates to a one-piece tubular member having thin walls and a substantially solid end, and more particularly to front axle centers for automobiles. The front axle center is that part of an automobile to which the stub axles of the front wheels are pivoted and which, with the rear axle, sustain the sprung weight of the car. The front axle center sustains about one-half the weight of the car and as it is subjected in all cases to the static load, and, where four wheel brakes are employed, also to torsional stress at its outer ends, it must be very strong. As commonly constructed, this part is formed of an I-beam which must necessarily be of considerable weight. In order to make this part lighter and so decrease the unsprung weight of the car, a tubular axle center has been used having an intermediate tubular part and tubular end sections with solid ends welded thereto. Such construction is too weak effectively to withstand the stresses to which such a part is subjected in use, and it also involves an increase in cost of manufacture. It was considered necessary to use three parts in order that the ends could be constructed with sufficient strength and body to serve as a means for pivotal engagement with the stub axles of the front wheels. I have discovered a way in which an axle center, or similar tubular member, may be made in one piece from a thin-walled steel tube, with integral ends sufficiently rugged to provide the necessary connections with the front wheels, or to another part, in which there are no transverse joints such as have heretofore been employed.

The object of the invention, therefore, is to decrease the weight of front axle centers as found in the present I-beam or like solid construction to a point equal to and even below the three part tubular construction referred to above, at the same time avoiding the weakness of the latter and very materially decreasing the manufacturing cost.

A broader object is to provide a one-piece tubular steel member having comparatively thin walls and substantially solid ends to serve as an efficient means whereby it may be connected to another object.

These objects are attained by the process and product hereinafter disclosed. A one piece tubular front axle center may take various forms and be made by different processes. One of the forms may possess an advantage in one respect over another yet the latter may have advantages in other respects. The form which was first developed I shall now describe, together with a process for making the same.

Referring to the annexed drawings:

Figure 1 is a front elevation of an axle center showing the wheels and spring pads in dot and dash lines to illustrate the relation of these parts to the axle.

Fig. 2 is a plan view of the axle shown in Fig. 1;

Fig. 3 is an enlarged view of the portion of the axle shown in Fig. 1, the end being in section;

Fig. 4 is a vertical cross section on line IV—IV of Fig. 3;

Fig. 5 is a view similar to Fig. 3 showing a modified form of the axle center end;

Fig. 6 is a plan view of the axle center end shown in Fig. 5;

Fig. 7 is an end view on line VII—VII of Fig. 5;

Fig. 8 is a view similar to Fig. 3 showing another form of the axle center end;

Fig. 9 is a plan view thereof;

Fig. 10 is an end elevation thereof on line X—X of Fig. 8;

Figure 12:
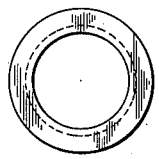
Figs. 11 to 21 illustrate the steps in the process of forming the end of a thin-walled steel tube into a substantially solid form.

Referring to the drawings in detail, in which the same reference numerals are employed to designate the same parts throughout the specification and drawings, an axle center 1 is formed from a thin-walled seamless steel tube, and is provided at its ends with a substantially solid portion 2 having therein a transverse aperture 3 adapted to receive the pivot pin 4 of the steering knuckle 5 of the front wheel of an automobile. The aperture 3 is preferably intersected by a small aperture 6 which serves as an opening for a pin for locking the pivot point. By the term "thin-walled" steel tube, I mean a tube the walls of which are as thin as they may be, depending upon the stresses to which the part is subjected in use, and the quality of the material of which it is made. Such a tubular member, when employed as a front axle center, may be too thin to serve as an efficient means for engaging the usual spring pad of an automobile, indicated in dotted lines at 8, and I find it preferable, therefore, to thicken the walls at the points where the spring pads are to be placed, as indicated at 7 (Figs. 3 and 4). This thickening of the walls of the tube is accomplished by an upsetting operation of the nature hereinafter indicated. By thickening the walls of the tube at the points of engagement of the spring pads, suitable provision may be made for the engagement of these pads to give them a firm support. As shown in Figs. 3 and 4 of the drawings this is accomplished by flattening the upper side of the tube as indicated at 9. The same result might be effected by forming grooves in the thickened part to receive suitable locking pins interposed between the tube and the spring pads. The same result might also be accomplished by making the tubular member angular in cross section either in whole or in part.

As shown in the drawings the axle centers are of the usual form in which the central portion is dropped below the points of connection with the steering knuckle. The ends of the axle may take different forms, one form being shown in Figs. 1 to 4, another in Figs. 5 to 7, and still another in Figs. 8 to 10. In each of these forms the pintle receiving aperture 3 is preferably arranged at a slight angle to the longitudinal axis of the central part of the axle center.

The process of forming the end of a thin-walled seamless steel tube into a substantially solid portion will now be described. The successive steps of the process are illustrated in Figs. 11 to 17.

Figure 11:
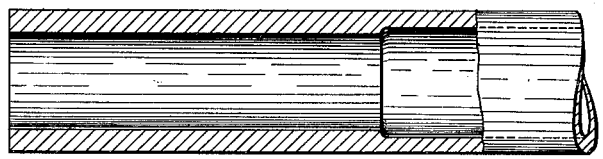
Figure 14:
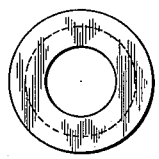
Figure 13:
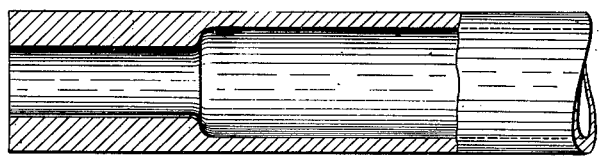
Figure 16:
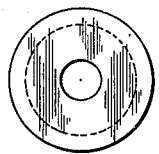
Figure 15:
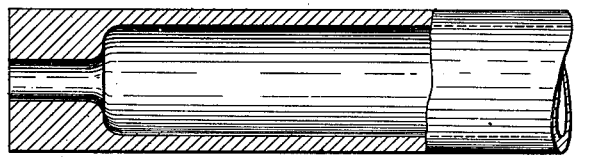

The process of upsetting the end of a tube to increase the thickness of the wall is well known to those skilled in the art. The end may be upset so as to cause the metal to flow inwardly, maintaining the outer diameter of the tube without change, or the inside diameter may remain the same, the metal being caused to flow outwardly. For my purposes it is deemed desirable to thicken the wall inwardly. This thickening is effected by exerting endwise pressure upon the tube while in a heated condition and while confined between suitable dies, with a sufficient cavity formed by the adjacent die surfaces to permit the hot metal, when subjected to such pressure, to flow and fill the die cavity. It is well known that there is a limit to the amount of metal which may be upset in one operation, and where it is desired to make a considerable enlargement two or more successive operations are necessary. In practice I have found that three successive operations will suffice to produce a wall of the desired thickness. Fig. 11 shows the result of the first upsetting operation, and Fig. 12 is an end view thereof. Figs. 13 and 14 show longitudinal sectional and end views of the tube after the second upsetting operation, and Figs. 15 and 16 are like views showing the result of the third upsetting operation. It will be seen that the wall extends inwardly and that it is quite thick, compared to the original thickness of the wall.

As stated above, it is not new to so thicken the end of a tube by successive operations, and therefore, so far as has just been described, the process is old, except to the extent to which the upsetting is carried and the character of the tube operated upon. So far as I am aware, no one prior to me has had the conception of starting with a thin-walled seamless steel tube and carrying the upsetting operation to a point that would serve to produce the article herein disclosed and claimed.

Figure 19:
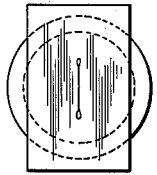
Figure 17:
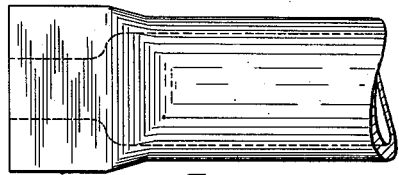
Figure 21:
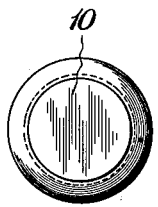
Figure 20:
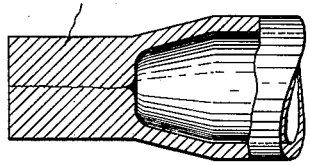
Figure 18:
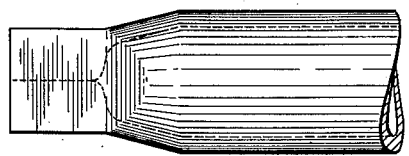
Figure 23:
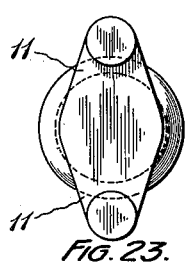
Fig. 23 is an end view thereof.
Figure 22:
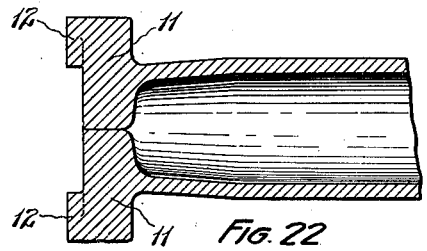
Fig. 22 shows a longitudinal section of the part shown in Fig. 18 after forging a special shape adapting it for connection to another part.

After the tube has been formed as indicated in Fig. 15, the end is forged to solid form of any desired shape, for example, rectangular in cross section, as indicated in Figs. 17 and 19, thereby producing a substantially solid end. Obviously the end may be made in other forms two of which are illustrated, respectively, in Figs. 20, 21, and Figs. 22, 23. In the first form the end is swaged into cylindrical form, as indicated at 10, and in the second it is forged to form two arms 11, from the ends of which extend two lugs 12, serving as convenient means of connection to another part.

In the specific application herein disclosed, the end of a tube is upset and then formed to any suitable shape. It is within the scope of the invention to form substantially solid portions at an intermediate part of a tube by the same process.

This step of forging or forming the end of the tube of the character above indicated, previously upset to the extent described, into solid form, is the principal feature of this invention. In this feature is involved the basic idea of the invention, which is the construction of a front axle center, or similar part, of great strength and small weight, capable of resisting bending and torsional stresses, to effect which an integral structure longitudinally of the part is necessary, i. e., there must be no transverse joints, although it is not necessary to this basic idea that there be integrality in the structure throughout.

This basic idea has been embodied in other forms, not of my own invention, which are made the subject-matter of a concurrently filed application. In one of these forms the axle center or part is made of two half or mating sections, each consisting of a channeled member having substantially solid ends, die-rolled from a solid bar of metal, the sections being suitably shaped after being formed and then welded together along a longitudinal axis. Another form is composed of mating sections, stamped from metal into channel form, shaped, and then welded together along a longitudinal axis. In this latter form the end is not substantially solid, but is readily adaptable for direct connection with the steering knuckle, as are the other forms.

In all these forms it will be observed, there is no transverse joint to weaken such a light structure, although in two of them there is a longitudinal welded joint, which, however, has no serious objection, more especially when the joints at the meeting edges of the channels are arranged in a horizontal plane when in use, as an axle center, since it lies in a neutral plane, the upper part of the bar being under compression and the lower part under tension.

While I have referred to certain modifications, it is obvious that in the practice of this invention, other modifications may be made by those skilled in the art. It is therefore to be understood that the invention includes all structures and processes comprehended within the scope of the appended claims.

What I claim is:

1. The process of making a one-piece tubular axle center part consisting in upsetting the ends of a thin-walled seamless steel tube to thicken the same, and subsequently flattening the ends to a substantially solid form.

2. The process set out in claim 1 with the added step of subsequently providing a pintle receiving aperture in the end.

3. The process of making a one-piece tubular vehicle axle consisting in upsetting the ends of a thin walled seamless steel tube to thicken the same, subsequently swaging and collapsing said ends to a substantially solid form and forming said ends so as to adapt them for pivotal connection with wheel spindles.

4. As an article of manufacture, a front axle for automotive vehicles formed from a single piece of thin walled tubing comprising a tubular center section of the normal size of the tubing, and having thickened wall sections formed by upsetting the tube at the spring seat locations, and swaged and thickened end sections merging into substantially solid pintle sections.

5. An axle for vehicles comprising a tubular member having reduced end portions of increased thickness and formed to receive bearing members of stub axles of the vehicles.

6. The method of forming a tubular axle, which comprises providing a steel tube of substantially uniform cross section throughout its length, heating an end portion of said tube, confining the outside of the heated portion, upsetting and deforming the metal of the end until a substantial portion of the tube is solid, and shaping the solid end to provide bearings for stub axle knuckles.

7. The method of forming a tubular axle which comprises providing a steel tube of greater length than required for the finished axle, heating a substantial portion of the tube end, upsetting and flattening said end until the tube is solid for an appreciable length, forging the solid end to the desired shape, clamping the tube intermediate its ends, and repeating the above steps on the opposite end.

8. An axle formed from a single length of thin walled seamless steel tubing comprising an intermediate portion having depressed flattened wall sections spaced apart to provide torque-resisting surfaces for securing the axle to the vehicle and having integral ends formed to provide pin-receiving bores angularly disposed to each other.

9. An axle formed from a single length of thin walled seamless steel tubing comprising an intermediate portion having depressed flattened wall sections spaced apart to provide torque-resisting surfaces for securing the axle to the vehicle and having integral ends upset and swaged to provide substantially solid pintle-receiving sections.

FREDERICK C. CRAWFORD.